US008460817B2

(12) United States Patent
Rourke et al.

(10) Patent No.: US 8,460,817 B2
(45) Date of Patent: Jun. 11, 2013

(54) METHOD FOR MANUFACTURE OF BATTERY POUCH TERMINALS

(75) Inventors: Rick F. Rourke, Metamora, MI (US); Robert J. Scheuerman, Washington, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 734 days.

(21) Appl. No.: 12/436,167

(22) Filed: May 6, 2009

(65) Prior Publication Data

US 2010/0281681 A1 Nov. 11, 2010

(51) Int. Cl.
*H01M 10/38* (2006.01)
*H01M 6/42* (2006.01)

(52) U.S. Cl.
USPC .......................... 429/123; 429/149; 29/623.1

(58) Field of Classification Search
None
See application file for complete search history.

(56) References Cited

U.S. PATENT DOCUMENTS

| | | | | |
|---|---|---|---|---|
| 3,582,575 A | * | 6/1971 | Scofield | 191/29 DM |
| 3,640,775 A | * | 2/1972 | Fitchman et al. | 429/161 |
| 4,019,251 A | * | 4/1977 | McCole | 29/623.2 |
| 4,521,489 A | * | 6/1985 | Rehfuss et al. | 428/412 |
| 4,521,498 A | * | 6/1985 | Juergens | 429/59 |
| 6,087,036 A | * | 7/2000 | Rouillard et al. | 429/66 |
| 6,242,128 B1 | * | 6/2001 | Tura et al. | 429/161 |
| 6,440,601 B1 | * | 8/2002 | Aoi et al. | 429/96 |
| 7,074,517 B2 | * | 7/2006 | Higashino | 429/66 |
| 2004/0029001 A1 | * | 2/2004 | Yamazaki et al. | 429/176 |
| 2007/0128513 A1 | * | 6/2007 | Hatta et al. | 429/176 |
| 2008/0124626 A1 | * | 5/2008 | Murata et al. | 429/179 |

* cited by examiner

*Primary Examiner* — Barbara Gilliam
*Assistant Examiner* — Jennifer Rea

(57) ABSTRACT

A manufacturing method for battery pouches enables the subsequent welding together of a stack of battery terminals with an interconnect member to form a battery pack. According to the method, a plurality of pouches containing energy storage medium and having positive terminals and negative terminals extending therefrom are supported side by side in a pouch supporting fixture and lids are lowered to clamp the pouches against movement. The terminals are clamped against movement by clamping the terminals at the bases thereof. Then, the end portions of the terminals are bent by die mechanisms to provide an offset shape in each terminal by which when the pouches are stacked adjacent one another, the positive terminals will contact one another and the negative terminals will contact one another. The clamping and bending are performed in a way that prevents the flow of electrical current between the positive and negative terminals.

20 Claims, 7 Drawing Sheets

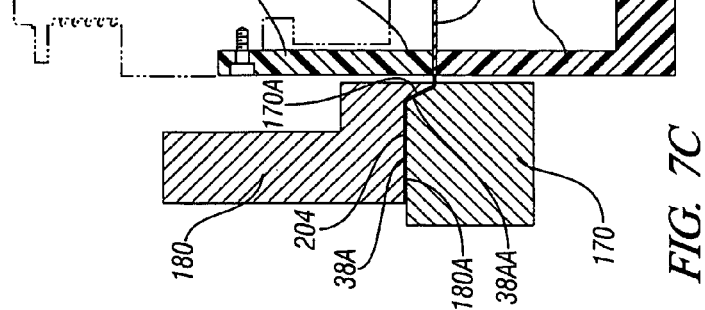
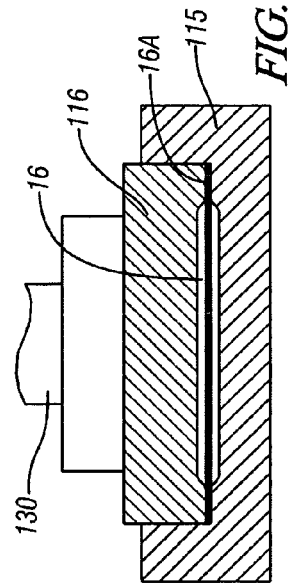
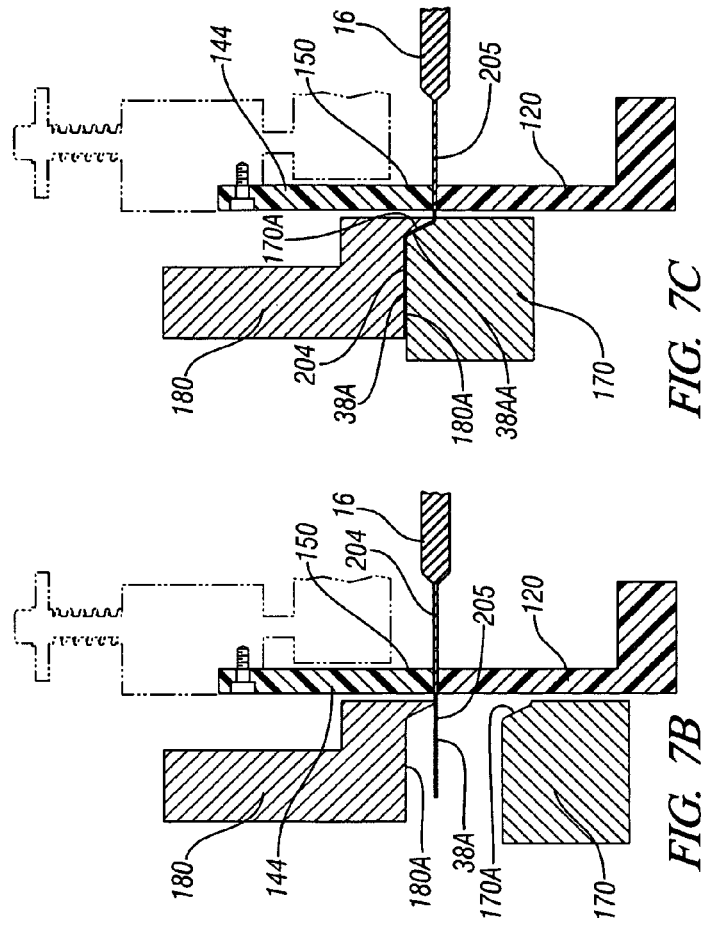
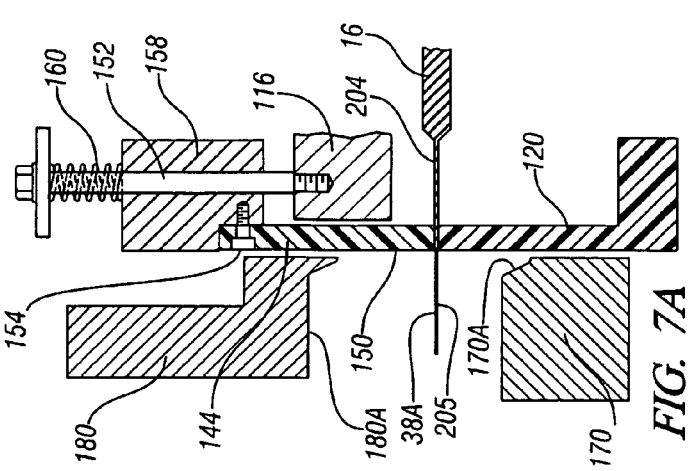
FIG. 6
FIG. 7A
FIG. 7B
FIG. 7C und States Patent

METHOD FOR MANUFACTURE OF BATTERY POUCH TERMINALS

FIELD OF THE INVENTION

The present invention relates to a method and apparatus for the bending of battery terminals in preparation for the ultrasonic welding together of a stack of battery terminals with an interconnect member to form a battery pack.

BACKGROUND OF THE INVENTION

Rechargeable energy storage systems for motor vehicles are assembled by electrically connecting together a plurality of individual battery cells. For example, lithium-ion battery cells typically include a soft housing pouch having a positive terminal and a negative terminal extending outwardly from the pouch. These battery cells are stacked in a battery case to bring the positive terminals together and the negative terminals together, thereby creating a stack of terminals to make a parallel electrical connection between the individual cells. Each terminal must have a precise bent shape in order to properly connect with the adjacent terminals and enable the subsequent ultrasonic welding together of the terminal stacks.

It would be desirable to provide a new and improved method for precise and economical bending of the battery pouch terminals in a manner that safeguards against injury to the pouches and prevents the inadvertent flow of electric current between the positive and negative terminals during the manufacturing operations.

SUMMARY OF THE INVENTION

A method is provided for manufacturing battery pouches for the subsequent welding together of a stack of battery terminals with an interconnect member to form a battery pack. According to the method, a plurality of pouches containing energy storage medium and having positive terminals and negative terminals extending therefrom are supported side by side in a pouch supporting fixture and lids are lowered to clamp the pouches against movement. The terminals are clamped against movement by clamping the terminals at the bases thereof. Then the end portions of the terminals are bent by die mechanisms to provide an offset shape in each terminal by which when the pouches are stacked adjacent one another, the positive terminals will contact one another and the negative terminals will contact one another. The clamping and bending are performed in a way that prevents the flow of electrical current between the positive and negative terminals.

Further areas of applicability of the present invention will become apparent from the detailed description provided hereinafter. It should be understood that the detailed description and specific examples, while indicating exemplary embodiments of the invention, are intended for purposes of illustration only and are not intended to limit the scope of the invention.

BRIEF DESCRIPTION OF THE DRAWINGS

The present invention will become more fully understood from the detailed description and the accompanying drawings.

FIG. 6 is a section view taken in the direction of Arrows 6-6 of FIG. 5.

FIGS. 7A, 7B, and 7C show a set of terminal bending dies and the progression of their operation.

DETAILED DESCRIPTION OF THE EXEMPLARY EMBODIMENTS

The following description of certain exemplary embodiments is exemplary in nature and is not intended to limit the invention, its application, or uses.

Figure 1:
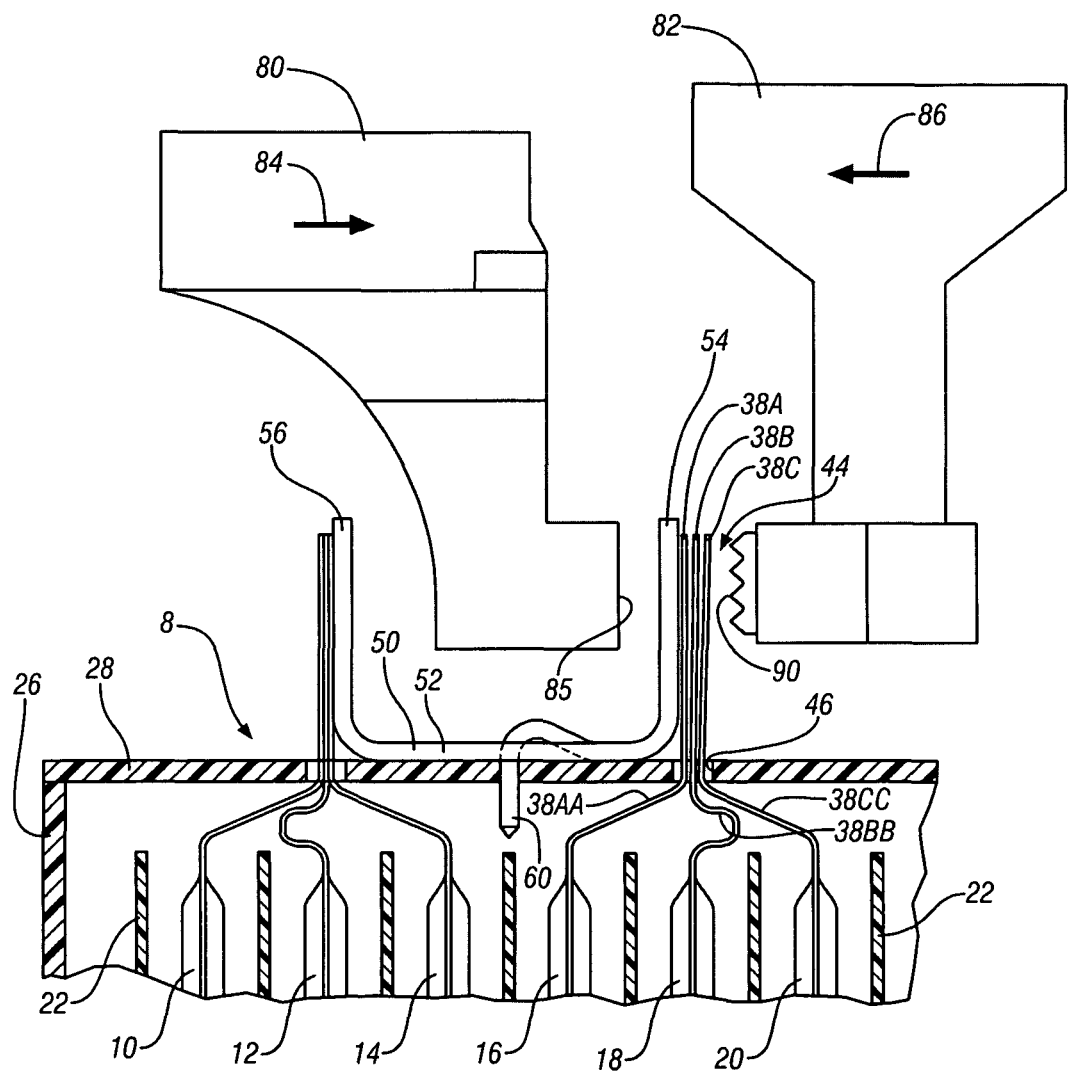
FIG. 1 is an end view of a battery pack of and having parts broken away to show the plurality of individual battery pouches supported in a battery housing and the shape of the terminals that are to be ultrasonically welded to ane interconnect bar.

Referring to FIG. 1, it is seen that a battery pack or module, generally indicated at 8, has a plurality of individual battery cell pouches 10, 12, 14, 16, 18, and 20 are stacked within a battery case 26 having a lid 28. Each of these battery cell pouches is a flexible bag-like container of lithium ion or other energy storage medium. The pouches are constructed of a relatively flexible material such as foil. The pouches are supported and separated in their stacked positions of FIG. 1 by support frames 22, as well insulators, heat exchangers, and other structures that are not shown in the drawing.

Figure 2:
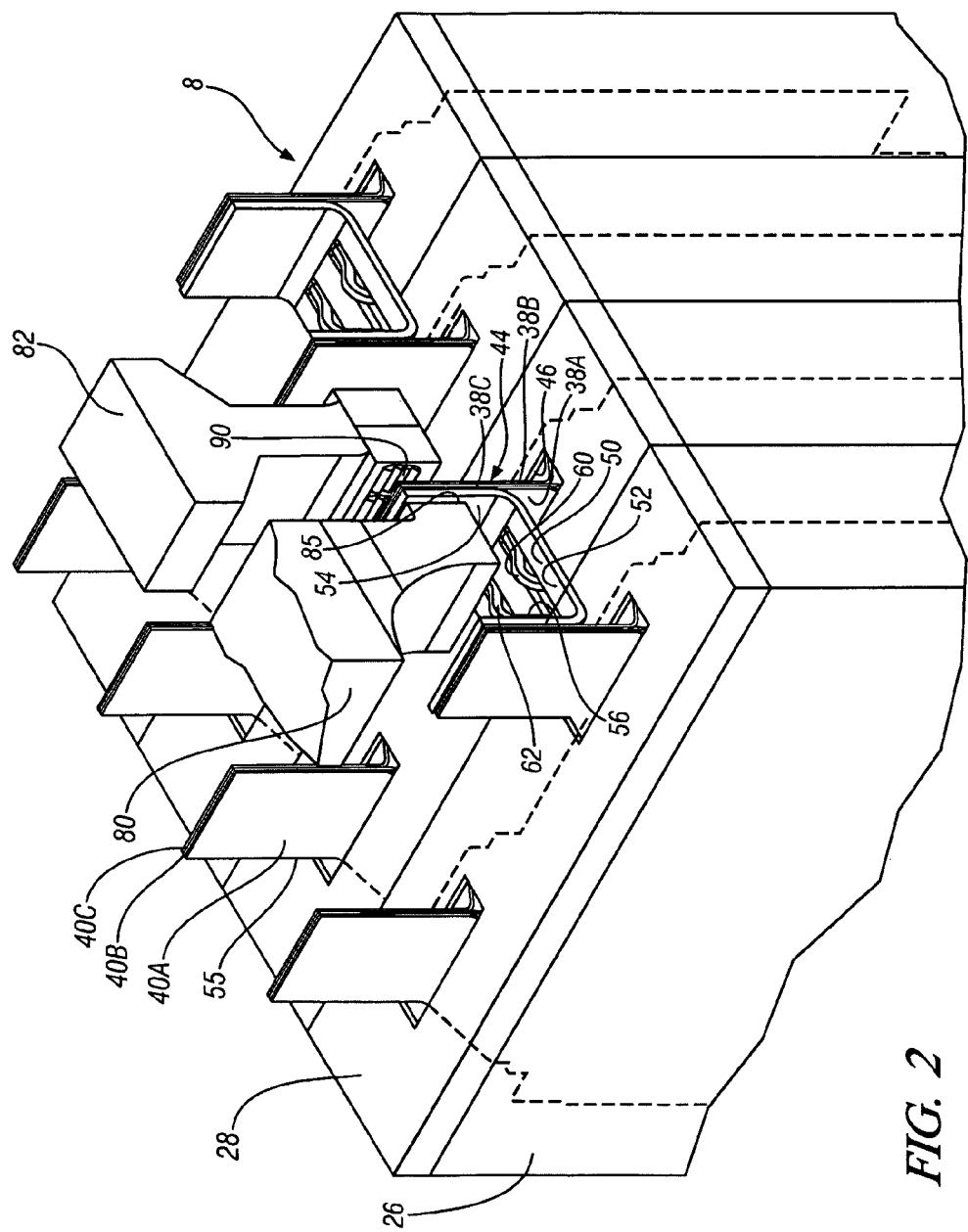
FIG. 2 is a perspective view of the battery pack and an ultrasonic welding device for welding battery terminals to an interconnect bar.

The battery cell pouch 16 is typical and includes a positive terminal 38A that extends out of the pouch 16. Also, as shown in FIG. 2, a negative terminal 40A extends out of the pouch 16. The positive terminal 38A is typically copper with a nickel coating and has a thickness of 0.2 mm. The negative terminal 40A is typically made of aluminum and has a thickness of approximately 0.2 mm. Thus, it will be understood that each battery cell pouch has both a negative terminal and a positive terminal that projects outwardly of the foil pouch.

As best seen in FIG. 1, the positive terminals 38A, 38B and 38C of the individual pouches 16, 18 and 20 pass through an opening 46 in the lid 28. The positive terminals 38A, 38B, and 38C of the three pouches are juxtaposed together to create a terminal stack 44 to be welded to an interconnect member or board 50. The interconnect member 50 is generally U-shaped with a base 52 and upstanding legs 54 and 56. As seen in FIG. 2, the base 52 has stakes 60 and 62 struck downward therefrom which will be imbedded in the case of the battery so that the interconnect member 50 is fixed upon the case. Likewise as seen in FIG. 2, the negative terminal 40A of the pouch 16 is juxtaposed with negative terminal 40B of pouch 18 and negative terminal 40C of pouch 20 to create a negative terminal stack 55

Referring again to FIG. 1, the positive terminal 38A can be considered the innermost of the terminals of the terminal stack 44 in the sense that the terminal 38A is the closest to the leg 54 of the interconnect member 50. The terminal 38A has a lateral bend 38AA by which the terminal 38A reaches over to contact with the terminal 38B. The terminal 38C can be considered the outermost of the terminals of the terminal stack 44 in the sense that the terminal 38C is the furthest away from the leg 54 of the interconnect member 50. The terminal 38C has a lateral bend 38CC by which the terminal 38C reaches over to contact with the terminal 38B. The terminal 38B has a return lateral bend 38BB.

Thus, as seen in FIG. 1, the terminals 38A, 38B, and 38C are loosely stacked together with 38A being the innermost terminal of the terminal stack 44 and closest to the interconnect member 50, the terminal 38C being the outermost terminal the furthest from the interconnect member 50, and terminal 38B being the center terminal in the stack 44 and sandwiched between the terminals 38A and 38C.

As seen in FIGS. 1 and 2, the ultrasonic welding will be performed by an ultrasonic weld mechanism that includes an anvil 80 and a sonotrode horn 82. The anvil 80 and the sonotrode horn 82 are mounted on a multi-axis manipulating mechanism, not shown, by which the anvil 80 and horn 82 can be lowered to the position shown in FIG. 1 where an anvil surface 85 of the anvil 80 is located adjacent the interconnect board vertical leg 54 and the horn 82 is located adjacent but spaced from the outermost terminal 38C of the terminal stack 44. The anvil 80 is moved rightwardly in the direction of arrow 84 into supporting contact with the vertical leg 54 so that the anvil 80 will support the interconnect board 50 against movement. The horn 82 will be moved leftwardly in the direction of arrow 86 to bring serrated gripping fingers 90 of the sonotrode horn 82 into contact with the outermost terminal 38C of the terminal stack 44.

After the leftward movement of the horn 82 into contact with the terminal stack 44, the sonotrode horn 82 will be cycled at 10,000 cycles per second to vibrate the serrated fingers 90 which in turn will vibrate the terminal stack 44 against the interconnect board vertical leg 54. This vibration is continued at a certain pressure and for a certain time until the individual terminals 38A, 38B, and 38C of the terminal stack 44 are ultrasonically welded to each other and the innermost of the terminals 38A is welded to the interconnect board vertical leg 54.

It will be understood that during the high speed vibration of the terminal stack 44 by the sonotrode horn 82, the lateral portions 38AA, 38BB, and 38CC of the terminals will flex slightly so that the vibratory energy is absorbed within the terminal tabs and not transmitted downwardly into the individual battery pouches.

After the making of the ultrasonic weld between the terminal tabs 38A, 38B, and 38C and the interconnect board 50, the horn 82 and anvil 80 will be moved away from one another and a multi-access manipulating mechanism will relocate the anvil 80 and horn 82 to the location of the next to be welded together terminal stack and interconnect board.

Figure 3:
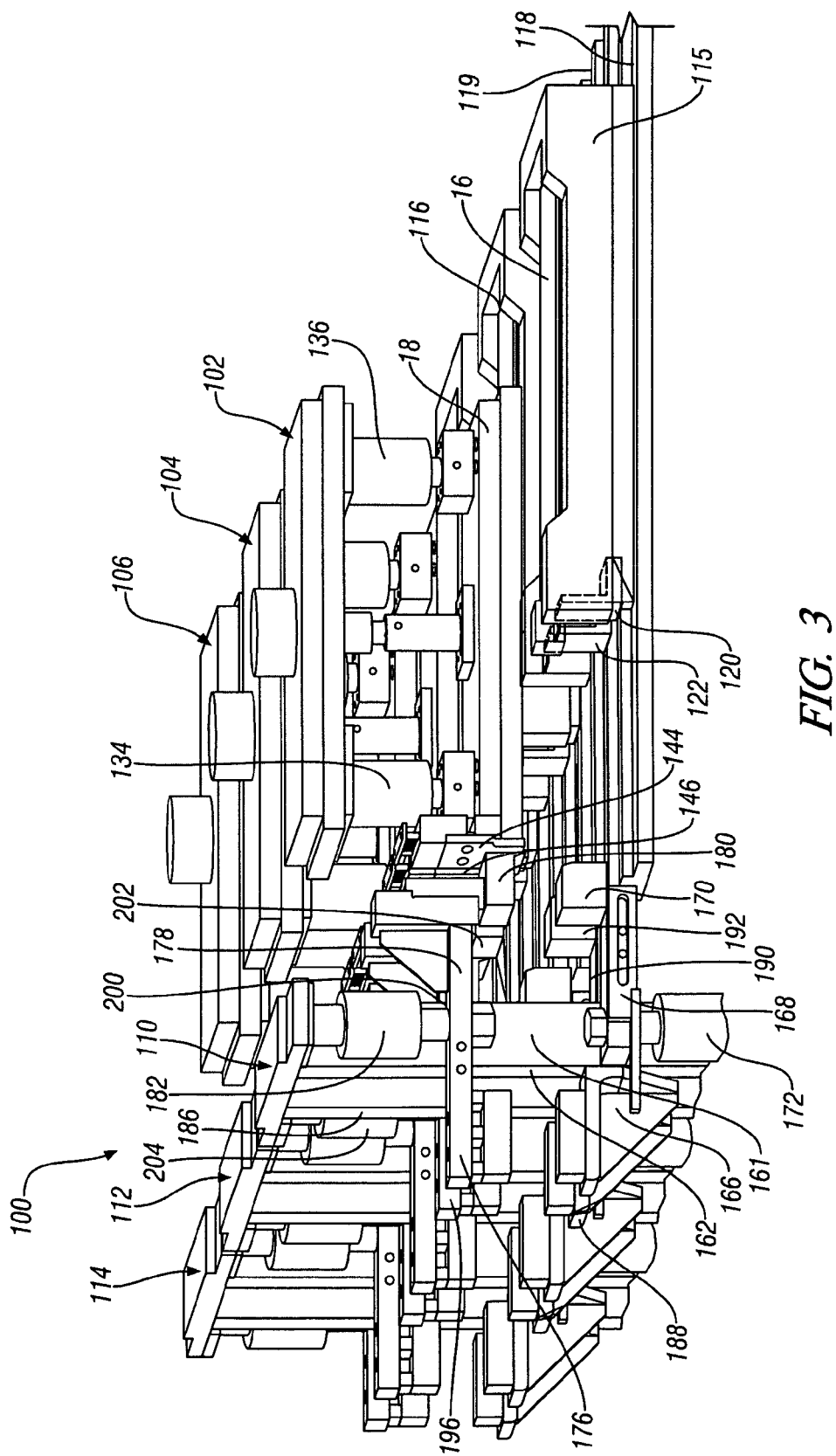
FIG. 3 is a perspective view of an apparatus for automated bending of the terminals that project from the individual battery pouches.

Referring to FIG. 3, it is seen that a tab bending apparatus generally indicated at 100 includes three pouch supporting fixtures 102, 104 and 106 that are mounted side by side on a machine base. These pouch supporting fixtures will support the individual battery pouches 16, 18 and 20. The tab bending fixture 100 also includes three tab bending fixtures 110, 112 and 114 that are mounted side by side on the machine base. These tab bending fixtures will bend the terminals of the pouches, as will be described hereinafter.

Figure 4:
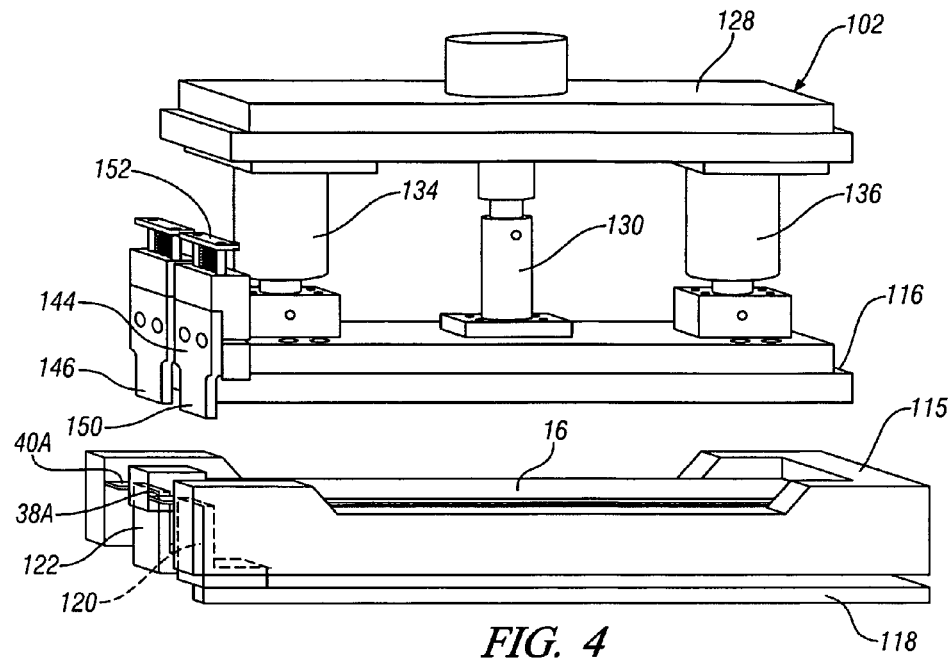
FIG. 4 is a partial fragmentary view of FIG. 3 showing the open position of a nesting fixture for holding an individual pouch and supporting the terminals thereof.

Referring to FIG. 4, the pouch supporting fixture 102 is shown and includes generally a pouch nesting fixture 115 and a lid 116 that will close into the nesting fixture 115 to hold the pouch 16. The nesting fixture 115 slides on a pair of rails 118 and 119 that are best seen in FIG. 3. In FIG. 3 the pouch nesting fixture 115 is slid to its rightward open position permitting the pouch 16 to be loaded and unloaded from the pouch nesting fixture 115.

The pouch nesting fixture 115 includes a lower terminal support or clamp 120 that underlies and supports the positive terminal 38A and a lower terminal support or clamp 122 that underlies and supports the negative terminal 40A. These lower terminal supports 120 and 122 are constructed of plastic or other dielectric material so that there will not be an electrical short between the positive and negative terminals 38A and 40A.

Figure 5:
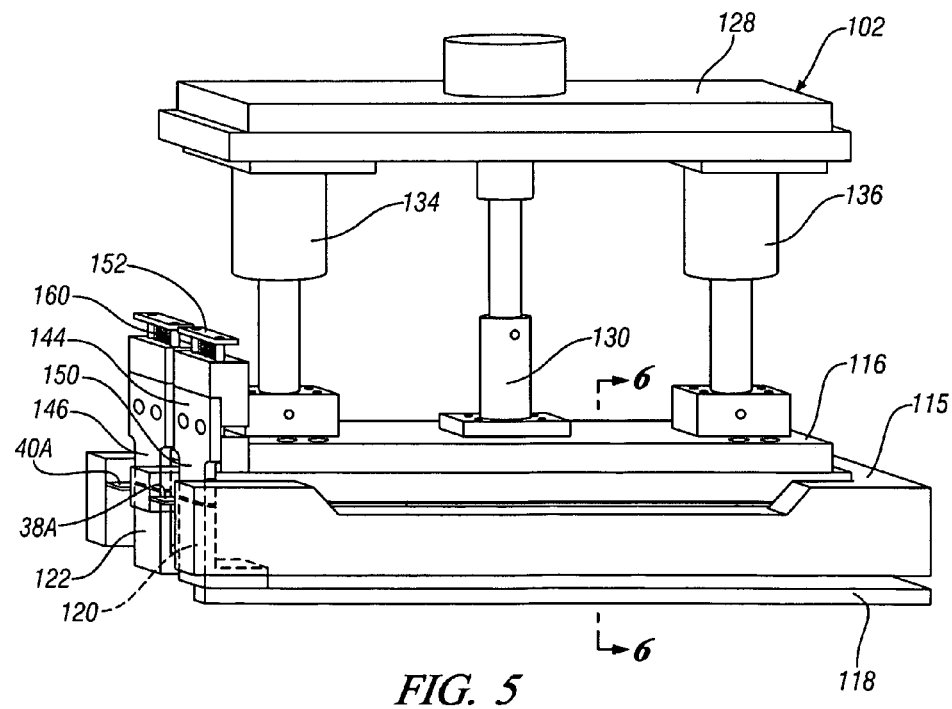
FIG. 5 is a view similar to FIG. 6 but shows the nesting fixture in the closed position supporting the pouch and the terminals for bending.

The lid 116 of the pouch supporting fixture 102 is mounted on a stationary mounting plate 128 by a pneumatic cylinder 130 that will extend and retract to raise and lower the lid 116 relative to the nesting fixture 115. Telescoping guide rods 134 and 136 also act between the mounting plate 128 and the lid 116 to stabilize the lid 116 and prevent its rotation about the axis of the pneumatic cylinder 130. In FIG. 4, the lid 116 is shown at its raised position. In FIGS. 5 and 6, the lid 116 has been lowered by the pneumatic cylinder 130 so that the pouch 16 is supported between the nesting fixture 115 and the lid 116 as is shown in FIG. 6. In particular, it is seen that the nesting fixture 115 supports the lower surface and the sides of the somewhat flexible pouch 16. And as seen in FIG. 6, a peripheral flange 16A of the pouch 16 has been captured between the nesting fixture 115 and the lid 116 to lend further support to the pouch 16.

FIGS. 4 and 5 also show that upper clamps 144 and 146 are provided on the lid 116 to cooperate with the lower clamps 120 and 122 in clamping and supporting the terminal tabs 38A and 40A. In particular, as best seen in FIG. 7A, the clamp 144 includes a jaw 150, made of a dielectric material. The jaw 150 is attached to a block 152 by screws 154 and the block 152 slides up and down a bolt 158 attached to lid 116. A coil compression spring 160 encircles the bolt 158 and bears upon the block 152 so that the jaw 150 is pushed downwardly by the spring 160.

As seen in FIG. 4, the jaw 150 is poised above the lower clamp 120 when the lid 116 is at its raised position of FIG. 4. When the lid 116 is lowered to the position of FIGS. 5 and 7A, the jaw 150 engages with the terminal 38A and the spring 160 begins to yield and thereby provide a clamping force that is determined by the spring constant of the spring 160.

Referring again to FIG. 3, it will be appreciated that the three tab bending fixtures 110, 112 and 114 are operated in unison in order to simultaneously bend the terminals of the three pouches 16, 18 and 20 that are supported as described above in the pouch supporting fixtures 102, 104, and 106.

As seen in FIG. 3, the bending fixture 110 has a stationary upright support 161 that is part of the machine base and will movably support bending dies for bending the terminals 38A and 40A. A first vertical track 162 is mounted vertically on the upright support 161. A track follower 166 rides on the vertical track 162 and mounts a die arm 168 that extends toward the pouch supporting fixture 102 and mounts a lower die 170. A pneumatic cylinder 172 will raise and lower the die arm 168. Another track follower 176 rides on the vertical track 162 and mounts an upper die arm 178 that extends toward the pouch supporting fixture 102 and mounts an upper die 180. A pneumatic cylinder 182 will raise and lower the upper die arm 178 and upper die 180.

A second vertical track 186 is mounted vertically on the upright support 161. A track follower 188 rides on the vertical track 186 and mounts a lower die arm 190 that extends toward the pouch supporting fixture 102 and mounts a lower die 192. A pneumatic cylinder, not shown, will raise and lower the lower die arm 190. Another track follower 196 rides on the vertical track 186 and mounts an upper die arm 200 that extends toward the pouch supporting fixture 102 and mounts an upper die 202. A pneumatic cylinder 204 will raise and lower the upper die arm 200 and upper die 202.

Referring to FIG. 7A, it is seen that the jaw 150 of the upper clamp 144 has been lowered toward the lower clamp 120 so that a base portion 203 of the terminal 38A is clamped and the an portion 205 of the terminal 38A is projecting beyond the clamps 144 and 120 and is positioned between the lower die 170 and the upper die 180. The upper die 180 and lower die 170 will be closed toward one another in order to accomplish the bending of the terminal 38A to the shape shown in FIG. 1. In particular, FIG. 7B shows that the upper die 180 is lowered into contact with the terminal 38A. Then, as shown in FIG. 7C the lower die 170 is raised and will bend the terminal 38A into conformance with the cavity shapes 170A and 180A provided respectively on the lower die 170 and upper die 180. Thus, the terminal 38A of the pouch 16 will have been bent to provide the desired lateral offset 38AA as shown in FIG. 1. By clamping the terminal 38A between the clamps 144 and 120, the bending forces that are applied to the terminal 38A will not be transmitted into the pouch 16.

After the positive terminal 38A has been bent, the negative terminal 40A will be bent by lowering the lower die 192 and raising the upper die 202. The lower die 192 and the upper die 202 have the same cavity shapes as the lower die 170 and upper die 180 so that the negative terminal 40A will be bent to the same shape as the positive terminal 38A. It will be understood that the positive terminal 38A are not bent at the same time as the negative terminal 40A in order to prevent the occurrence of an electrical short between the positive and negative terminals.

Figure 8C:
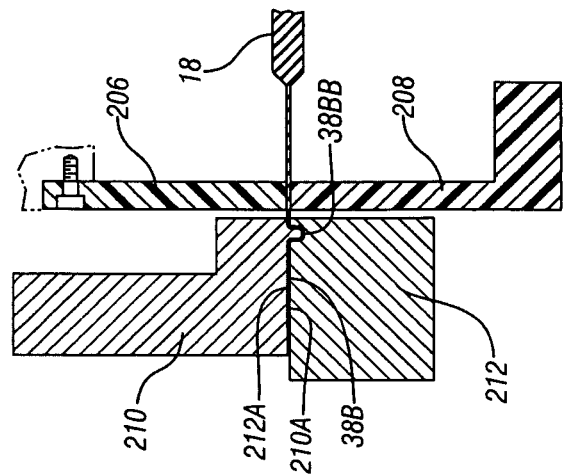
FIGS. 8A, 8B, and 8C show another set of terminal bending dies and the progression of their operation.
Figure 8B:
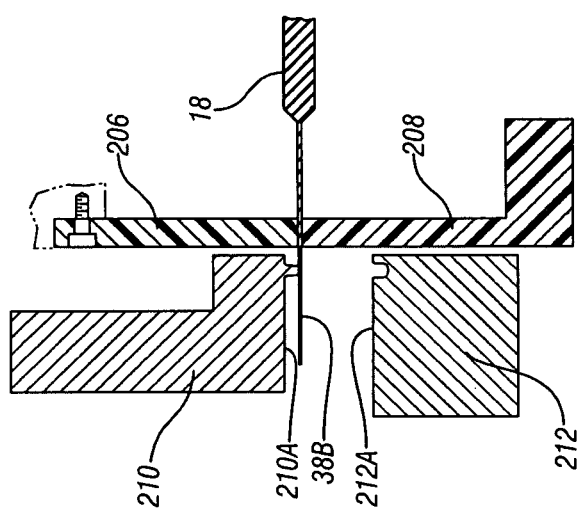
Figure 8A:
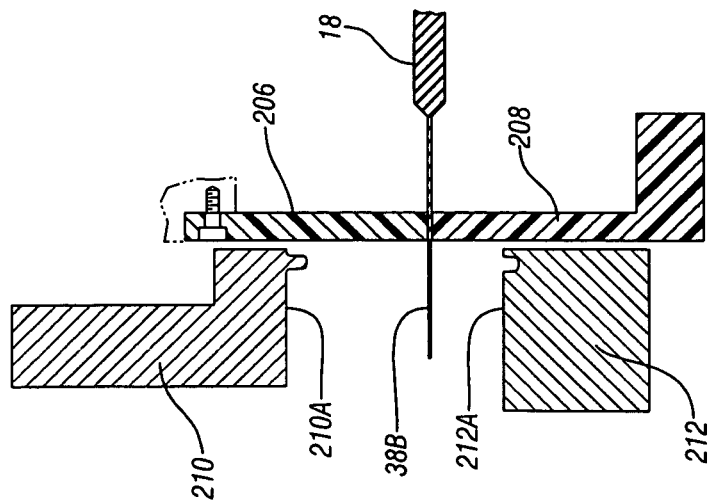

FIGS. 8A, 8B and 8C show the sequence of operation for the bending dies of the bending fixture 112 for bending the positive terminal 38B of the pouch 18. The positive terminal 38B of the pouch 18 has been clamped between an upper clamp 206 and a lower clamp 208 and projects between upper die 210 and lower die 212. In FIG. 8B, the upper die 210 has been lowered to contact the terminal 38B. In FIG. 8C the lower die 212 has been raised and accordingly the terminal 38B is bent into the shape of the cavities 210A and 212A provided respectively on the upper die 210 and lower die 212. Thus, it is seen that the terminal 38B has been provided with the offset 38BB as shown in FIG. 1.

Figure 9C:
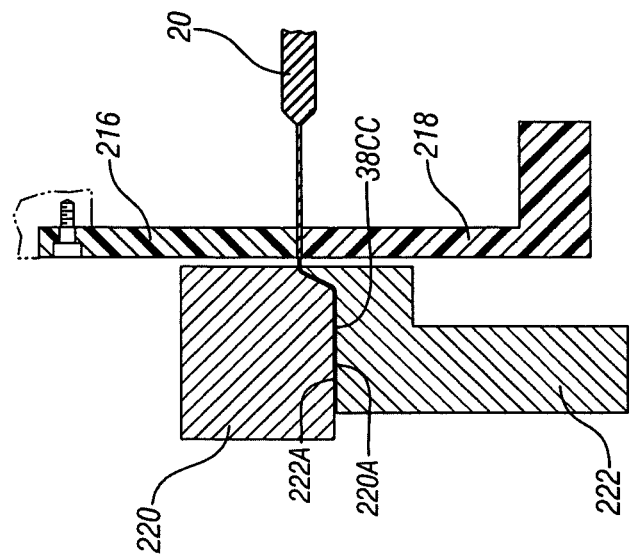
FIGS. 9A, 9B, and 9C show a third set of terminal bending dies and their progressive operation.
Figure 9B:
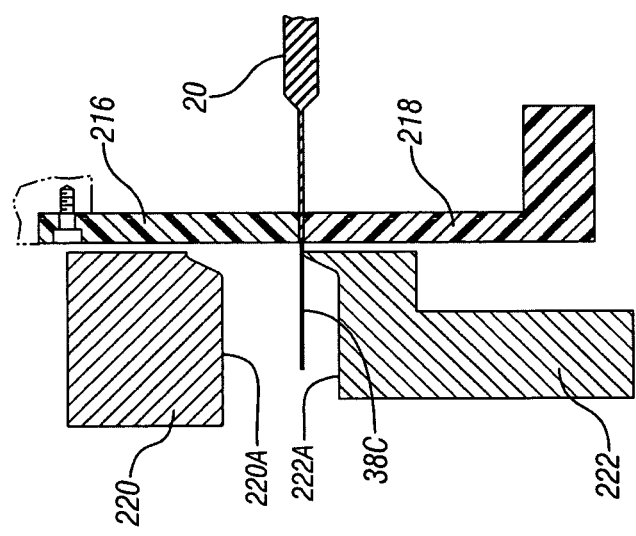
Figure 9A:
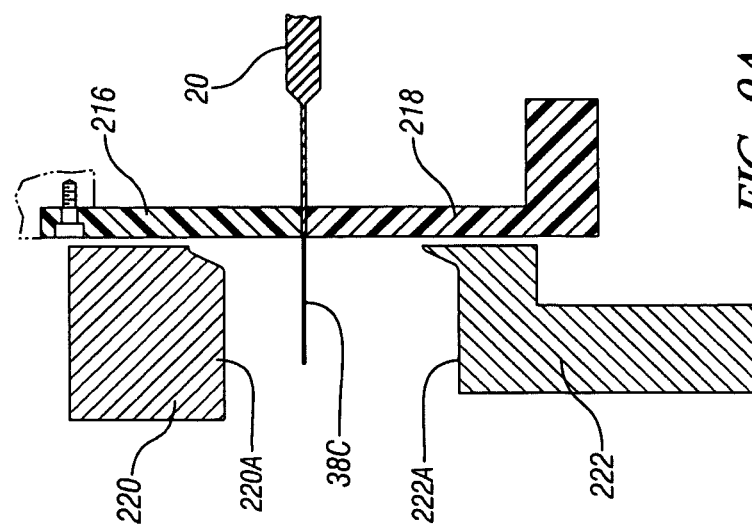

FIGS. 9A, 9B, and 9C show the sequence of operation for the bending dies of the bending fixture 114 for bending the positive terminal 38C of the pouch 20. The terminal 38C of the pouch 20 has been clamped between the upper clamp 216 and a lower clamp 218 and projects between upper die 220 and lower die 222. In FIG. 9B the lower die 222 has been raised. In FIG. 9C the upper die 220 has been lowered and accordingly the terminal 38C is bent into the shape of the cavities 220A and 222A provided respectively on the upper and lower dies 220 and 222. Thus, it is seen that the terminal 38C of the pouch 20 has been provided with the offset 38CC as shown in FIG. 1.

Thus, it is seen that the invention provides a new and improved method and apparatus for the bending of terminals for the manufacture of a battery pack by the ultrasonic welding of battery cell terminals to an interconnect board. The method and apparatus enables the automated bending of both the positive and negative terminals in a sequence of operation that prevents the occurrence of short circuits between the terminals. In addition, during the bending, the terminals and the flexible pouches are supported and also the terminals are supported and clamped in a manner to prevent the transmission of bending force into the pouches during the bending operation.

The foregoing description of the invention is merely exemplary in nature and, thus, variations thereof are intended to be within the scope of the invention.

What is claimed is:

1. A method of manufacturing battery pouches for the ultrasonically welding together of a stack of battery terminals with an interconnect member to form a battery pack, comprising:

providing a plurality of flexible pouches containing energy storage medium and each flexible pouch having a positive terminal and a negative terminal extending therefrom, said terminals having a base and a terminal end portion;

supporting the plurality of flexible pouches side by side in a pouch supporting fixture;

after supporting the plurality of flexible pouches side by side, clamping each of the terminals against movement by gripping each of the terminals at the bases;

after clamping each of the terminals against movement by gripping each of the terminals at the base, bending each of the end portions of the terminals by a die mechanism to provide an offset shape including a lateral bend in each terminal by which when the flexible pouches are subsequently removed from the fixture and stacked adjacent one another the positive terminals will contact one another and the negative terminals will contact one another;

after the bending, removing the plurality of flexible pouches from the supporting fixture;

after removing the plurality of flexible pouches from the supporting fixture, stacking the flexible pouches within a battery case with the terminals extending outwardly through an opening in the battery case with the positive terminals contacting one another and the negative terminals contacting one another;

and then ultrasonically welding the terminals to an interconnect member for electrically connecting the positive terminals and negative terminals of the flexible pouches, said ultrasonic welding including high-speed vibration of the terminals and flexing of the lateral bends of the terminals so that vibratory energy is absorbed within the lateral bends of the terminals and not transmitted into the plurality of flexible pouches.

2. The method of claim 1 further comprising supporting the plurality of flexible pouches in a pouch supporting fixture by nesting the flexible pouches in nesting fixtures with the terminals projecting outward from the nesting fixtures and closing lids onto the nesting fixtures to support the flexible pouches against movement.

3. The method of claim 2 further comprising said nesting fixtures being mounted on slide rails so that the nesting fixtures can be slid between an open position slid away from the lids to enable loading and unloading of flexible pouches from the nesting fixtures and closed positions in which the lids are closed onto the nesting fixtures.

4. The method of claim 2 further comprising said nesting fixtures having thereon lower clamps that support the bases of each of the terminals.

5. The method claim 4 further comprising said lower clamps being of dielectric material.

6. The method of claim 4 further comprising said lids having thereon upper clamps that engage with the base portion of the terminals when the lids are closed so that the base portion of the terminals are clamped between the upper clamps and the lower clamps.

7. The method of claim 6 further comprising said upper clamps being spring loaded to apply a clamping force against the base portion that is determined by the spring load.

8. The method of claim 6 further comprising the upper clamps being of dielectric material.

9. The method of claim 1 further comprising the bending of the end portion of the terminals being performed by upper and lower dies both of which are spaced away from electrical contact with the terminals and then are closed about the terminals to perform the bending.

10. The method of claim 1 further comprising separate upper and lower die sets being provided for bending of the positive terminals and bending of the negative terminals, and the die sets for bending the positive terminals being closed about the positive terminals not at the same time that the die sets for the bending of the negative terminals to avoid current flow through the die sets between the positive and negative terminals.

11. The method of claim 10 further comprising upper and lower clamps mounted on the pouch supporting fixture and supporting the bases of the terminals while the end portions of the terminals extend between the upper and lower dies.

12. The method of claim 10 further comprising the pouch supporting fixtures having a nesting fixture for nesting the flexible pouches, each nesting fixture having a fixed lower clamp of dielectric material for supporting the base of the terminals and movable upper clamps of dielectric material for clamping the base of the terminals.

13. The method of claim 12 further comprising a lid associated with each of the nesting fixtures and being lowered onto the flexible pouches so that the flexible pouches are immovably supported in the nesting fixtures, and the upper clamps are mounted on the lids so when the lids are lowered to support the flexible pouches the upper clamps are also lowered therewith to clamp the bases of the terminals.

14. The method of claim 13 further comprising the upper clamps being mounted on the lids by springs so that the springs load the upper clamps against the bases of the terminals.

15. The method of claim 14 further comprising closing at least one die set to simultaneously bend the positive terminals of all of the plurality of flexible pouches, and, at a separate time, closing at least another die set to simultaneously bend the negative terminals of all of the plurality of flexible pouches.

16. A method of manufacturing battery pouches for the ultrasonically welding together of a stack of battery terminals with an interconnect member to form a battery pack, comprising:
providing a plurality of flexible pouches containing energy storage medium and each pouch having a positive terminal and a negative terminal extending therefrom; said terminals having a base and a terminal end portion;
supporting the plurality of flexible pouches side by side in a flexible pouch supporting fixture having a nesting fixture for each flexible pouch;
after supporting the plurality of flexible pouches side by side, closing a lid onto each of the flexible pouches to clamp the flexible pouches in the nesting fixtures;
after closing the lid onto each of the flexible pouches, clamping the terminals against movement by gripping the terminals at the bases thereof via fixed lower clamps that support the bases of the terminals and spring loaded upper clamps that are carried by the lids;
after clamping the terminals against movement, bending the end portions of the terminals by a die mechanism to provide an offset shape including a lateral bend in each terminal by which when the flexible pouches are stacked adjacent one another the positive terminals will contact one another and the negative terminals will contact one another;
after the bending, removing the plurality of flexible pouches from the supporting fixture;
after removing the plurality of flexible pouches from the supporting fixture, stacking the flexible pouches within a battery case with the terminals extending outwardly through an opening in the battery case with the positive terminals contacting one another and the negative terminals contacting one another;
and then ultrasonically welding the terminals to an interconnect member for electrically connecting the positive terminals and negative terminals of the flexible pouches, said ultrasonic welding including high-speed vibration of the terminals and flexing of the lateral bends of the terminals so that vibratory energy is absorbed within the lateral bends of the terminals and not transmitted into the plurality of flexible pouches.

17. The method of claim 16 further comprising said nesting fixtures being mounted on slide rails so that the nesting fixtures can be slid between an open position slid away from the lids to enable loading and unloading of flexible pouches from the nesting fixtures and closed positions in which the nesting fixtures are registered with the lids for closing of the lids onto the nesting fixtures.

18. The method of claim 16 further comprising separate upper and lower die sets being provided for bending of the positive terminals and bending of the negative terminals, and the die sets for bending the positive terminals being closed about the positive terminals not at the same time that the dies sets for the bending of the negative terminals to avoid current flow through the die sets between the positive and negative terminals.

19. The method of claim 16 further comprising said upper clamps and said lower clamps being of dielectric material to avoid current flow between terminals.

20. A method of manufacturing battery pouches for the ultrasonically welding together of a stack of battery terminals with an interconnect member to form a battery pack, comprising:
providing a plurality of flexible pouches containing energy storage medium and each pouch having a positive terminal and a negative terminal extending therefrom; said terminals having a base and a terminal end portion;
supporting the plurality of flexible pouches side by side in a pouch supporting fixture having a nesting fixture for each pouch;
after supporting the plurality of flexible pouches side by side, closing a lid onto each of the flexible pouches to clamp the flexible pouches in the nesting fixtures;
after closing the lid onto each of the flexible pouches, clamping the terminals against movement by gripping the terminals at the bases thereof via fixed lower clamps of dielectric material that support the bases of the terminals and spring loaded upper clamps of dielectric material that are carried by the lids;
after clamping each of the positive terminals against movement by gripping each of the positive terminals at the base, simultaneously bending the end portions of the all of the positive terminals by closing upper and lower die sets to provide an offset shape including a lateral bend in each positive terminals by which when the flexible pouches are stacked adjacent one another the positive terminals will contact one another;

after clamping each of the negative terminals against movement by gripping each of the negative terminals at the base, simultaneously bending the end portions of all of the negative terminals by closing upper and lower die sets to provide an offset shape including a lateral bend in each of the negative terminals by which when the flexible pouches are stacked adjacent one another the negative terminals will contact one another;

said bending of the end portions of the positive terminals not being performed at the same time of the bending of the negative to avoid the flow of current between positive and negative terminals during the bending;

after the bending, removing the plurality of flexible pouches from the supporting fixture;

after removing the plurality of flexible pouches from the supporting fixture, stacking the flexible pouches within a battery case with the terminals extending outwardly through an opening in the battery case with the positive terminals contacting one another and the negative terminals contacting one another;

and then ultrasonically welding the terminals to an interconnect member for electrically connecting the positive terminals and negative terminals of the flexible pouches, said ultrasonic welding including high-speed vibration of the terminals and flexing of the lateral bends of the terminals so that vibratory energy is absorbed within the lateral bends of the terminals and not transmitted into the plurality of flexible pouches.

\* \* \* \* \*